United States Patent [19]

Martin

[11] Patent Number: 5,552,517

[45] Date of Patent: Sep. 3, 1996

[54] PRODUCTION OF POLYSUCCINIMIDE IN AN ORGANIC MEDIUM

[75] Inventor: David A. Martin, Ballwin, Mo.

[73] Assignee: Monsanto Company, St. Louis, Mo.

[21] Appl. No.: 398,323

[22] Filed: Mar. 3, 1995

[51] Int. Cl.⁶ .................................................. C08G 69/10
[52] U.S. Cl. ..................... 528/363; 528/328; 528/361; 525/418; 525/419; 525/420
[58] Field of Search ..................................... 528/363, 361, 528/328; 525/418, 419, 420

[56] References Cited

U.S. PATENT DOCUMENTS

| | | | |
|---|---|---|---|
| 3,846,380 | 11/1974 | Fujimoto et al. | 525/420 |
| 4,333,844 | 6/1982 | Duggleby et al. | 252/97 |
| 4,363,797 | 12/1982 | Jacquet et al. | 424/70.12 |
| 4,407,722 | 10/1983 | Davies et al. | 252/91 |
| 4,428,749 | 1/1984 | Morris | 8/137 |
| 4,971,724 | 11/1990 | Kalota et al. | 252/390 |
| 5,057,597 | 10/1991 | Koskan | 528/328 |
| 5,142,062 | 8/1992 | Knebel et al. | 548/545 |
| 5,219,986 | 6/1993 | Cassata | 530/324 |
| 5,221,733 | 6/1993 | Koskan et al. | 530/324 |
| 5,266,237 | 11/1993 | Freeman et al. | 252/542 |
| 5,315,010 | 5/1994 | Koskan et al. | 548/520 |
| 5,319,145 | 6/1994 | Paik et al. | 528/328 |
| 5,371,179 | 12/1994 | Paik et al. | 528/363 |
| 5,380,447 | 1/1995 | Kirk et al. | 252/8.6 |
| 5,380,817 | 1/1995 | Paik et al. | 528/328 |

FOREIGN PATENT DOCUMENTS 2424293  12/1979  France .

OTHER PUBLICATIONS

"Temperature Effect on the Molecular Weight and the Optical Purity of Anhydropolyaspartic Acid Prepared by Thermal Polycondensation", *Bulletin of the Chemical Society of Japan*, vol. 51(5), 1555–1556 (1978), Kokufuta et al.

*J.O.C.S.*, vol. 26, 1084–1091 (1961), J. Kovacs et al.

Technical Bulletin No. 9171A "Cooling/Heating Fluid FDA Grade, Low Odor–120F to 500" Therminol D–12 Heat Transfer Fluid by Monsanto Company.

National Council on Research and Development NRCD 8–76, Seawater Desalination 150–157 (1977), Sarig et al.

*Primary Examiner*—Shelley A. Dodson
*Assistant Examiner*—P. Hampton-Hightower
*Attorney, Agent, or Firm*—Michael J. Murphy

[57] ABSTRACT

There is disclosed a process for preparing polysuccinimides by the thermal condensation of amino acids such as L-aspartic acid in high boiling organic reaction medium whereby a polymer is provided having highly desirable color characteristics. The organic medium is selected from high boiling alkyl alcohols having from 7 to 14 carbon atoms such as isodecanol and high boiling alkanes having from 10 to 20 carbon atoms such as dodecane. The organic medium can be employed in conjunction with acid catalysts for the condensation reaction and can be easily recovered for reuse with little or no need for purification.

22 Claims, No Drawings

PRODUCTION OF POLYSUCCINIMIDE IN AN ORGANIC MEDIUM

This invention relates to the production of polysuccinimide by thermal polymerization of L-aspartic acid in an organic medium. More particularly, this invention relates to the thermal polymerization of L-aspartic acid in a high boiling alkyl alcohol or alkane.

BACKGROUND OF THE INVENTION

Polyaspartic acid has been produced by thermal polymerization of L-aspartic acid which involves heating the acid to a temperature in the range of from about 200° C. to about 400° C. Water is driven off as the acid polymerizes to form polysuccinimide. The imide is easily converted to polyaspartic acid by basic hydrolysis. Early interest in such processes related to theories for formation of prebiotic polypeptides. For the purpose of testing such theories laboratory experiments used powdered L-aspartic acid, usually packed in the bottom of a flask which was then heated below the melting point of the acid. Such reactions were slow and took place over many hours. One such example is reported by Kokufuta et al. in Bulletin of the Chemical Society of Japan Vol. 51 (5) 1555–1556 (1978) "Temperature Effect on the Molecular Weight and the Optical Purity of Anhydropolyaspartic Acid Prepared by Thermal Polycondensation." The structure of anhydropolyaspartic acid has been thoroughly investigated such as by J. Kovacs et al. in J.O.C.S. Vol. 26 1084–1091 (1961).

In recent years many utilities have been suggested for anhydropolyamino acid. Such polyamides have been suggested as potential drug carriers by Neuse et al. in Die Angewandte Makronmolekulare Chemie 192 35–50 (1991) "Water-soluble polyamides as potential drug carriers." They have also been tested as scale inhibitors with respect to natural sea water and calcium sulfate in particular by Sarig et al. as reported by the National Council on Research and Development (NRCD 8–76, Seawater Desalination 150–157 (1977). Polyaspartic acid has been well known for its ability to disperse solid particles in detergent formulations, having been mentioned as a dispersant in numerous patents, a few of which are U.S. Pat. Nos. 4,363,797; 4,333,844; 4,407,722 and 4,428,749. Also, as described in U.S. Pat. No. 4,971,724 to Kalota et al., it has been discovered that compositions comprising polyamino acids such as aspartic acid, when ionized at alkaline pH, effectively inhibit corrosion of ferrous metals in the presence of aqueous medium. Various derivatives of polyamino acids have also been made wherein attributes have been supplied by groups attached to reactive sites on the molecule. One such example is disclosed in U.S. Pat. No. 3,846,380 to Fujimoro et al.

Because of the various impending potential utilities of anhydropolyamino acids, interest in processes for preparing such compounds in large volume, particularly polyaspartic acid, has increased. This interest has resulted in several recent patents being issued which are directed to fluid bed systemic; in particular, U.S. Pat. No. 5,219,986 to Cassata. Other such patents are U.S. Pat. Nos. 5,057,597 and 5,221,733 to Koskan and Koskan et al. respectively. More recently, patents have issued covering a process for preparing the polysuccinimide by means of tray driers such as a rotary tray drier in U.S. Pat. No. 5,319,145 to Palk et al. and an indirectly heated tray drier in U.S. Pat. No. 5,315,010 to Koskan et al. When phosphoric acid is employed in these processes the aspartic acid undergoes polymerization to form the polysuccinimide, forming a course powder containing lumps of up to about two and one-half centimeters in diameter. Prior to subsequent processing the course powder must be treated to remove the lumps. Furthermore, in the use of an acidic catalyst such as phosphoric the powder undergoes a tacky phase which makes the powder difficult to handle in these dryers.

It has been often noted in the literature that the color of the polysuccinimide is related in rough manner to the time/temperature relationship in its production. For example, the color of the product from processes employing relatively longer reaction time under elevated temperature produces more darkly colored polysuccinimide than is produced with shorter reaction time and lower temperatures. A typical teaching of this phenomenon is found in a publication entitled "Temperature Effect on the Molecular Weight and the Optical Purity of Anhydropolyaspartic acid Prepared by Thermal Polycondensation" by Kokufuta et al., Bulletin of the Chemical Society of Japan, Vol. 51, pp. 1555–1556, 1978.

Many efforts have been made to lower the time/temperature relationship by employing the above noted dryers. However, the polysuccinimide produced by such processes possesses an undesirable color. The color of the polysuccinimide is transferred to the water soluble salt upon hydrolysis of the initial product.

It has been reported in the literature that the use of acidic catalysts such as phosphoric acid reduces the color of the resulting polysuccinimide. It is believed that phosphoric acid increases the reaction rate and therefore reduces the amount of time required at high temperature for completion of the reaction. While color of the polysuccinimide produced in a solution of phosphoric acid is improved, the use of large amounts of acid is inconvenient. Another attempt to employ liquid media for the L-aspartic polymerization process is found in U.S. Pat. No. 5,371,179 wherein the use of poly-(alkylene glycols) is employed.

In one attempt to overcome the color problem it has been found that the polyaspartate formed by thermal polymerization followed by alkaline hydrolysis is treated with bleach in water solution. This treatment is reported to decolorize the solution of polyaspartate as noted in U.S. Pat. No. 5,292,864 to Wood, et al. However, in many instances the color of the polysuccinimide becomes a disadvantage as this initial product is employed without first converting it to the water soluble polyaspartate salt as was done in the above noted patent to Wood et al. For example, in U.S. Pat. No. 5,266,237 to Freeman et al. and Australian Patent AU-A14775/92, the polysuccinimide is added directly to other ingredients to form a detergent composition. The color of the polysuccinimide, particularly in detergent applications, is desirably white. Thus the method of decolorizing the water solution of the salt is not useful in preparing desirable compositions of the above noted patent to Freeman et al. which incorporate the succinimide. Accordingly, there is needed a convenient process for the production of polysuccinimide which has acceptable color for detergent applications without the need for decolorization. More convenient liquid media are needed for large scale production of the polysuccinimide which has very little color.

BRIEF DESCRIPTION OF THE INVENTION

There has been discovered a process for the polymerization of L-aspartic acid wherein the L-aspartic acid is dispersed in a liquid medium comprising an organic medium selected from the group consisting of high boiling alkyl alcohols and alkanes or mixtures thereof. The term "high boiling" as used in this application and claims means a liquid having a boiling point at atmospheric pressure above the reaction temperature for the thermal condensation of L-aspartic acid. In operation, the L-aspartic acid is slurried in the organic medium. The optional catalyst such as phosphoric acid can be added after the slurry is formed, preferred, or dispersed evenly throughout the monomer prior to being added to the organic liquid. The slurry is heated within the range of from about 140° C. to about 260° C. with agitation sufficient to prevent the solids from congealing. As the reaction proceeds, water, which is insoluble in the organic medium of this invention, is removed from the mixture by distillation. Reaction times range from about 1 to about 5 hours. The reaction product is a solid which is easily removed from the reaction medium by conventional means such as filtration, etc. The liquid medium can be recycled for preparation of additional amounts of polysuccinimide.

In most instances the polysuccinimide prepared in accordance with this invention is hydrolyzed in basic medium to provide polyaspartic acid which has many utilities as noted above. The hydrolysis is typically carried out in situ, without removing the polysuccinimide from the organic medium by adding an aqueous 5–20% solution of sodium hydroxide at a temperature of <100° C. for a period sufficient to hydrolyze the polymer thereby producing the sodium salt of the acid. The hydrolyzed product will remain in the aqueous phase and is easily separated from the immiscible organic medium by decantation or any suitable means for liquid-liquid separation.

DETAILED DESCRIPTION OF THE INVENTION

The organic medium of this invention is selected from the group consisting of high boiling alkyl alcohols and alkanes. The high boiling alcohols are those having from 7 to 14 carbon atoms and can be straight or branched chain. High boiling alkanes are straight or branched chain alkanes having from 10 to 20 carbon atoms.

Typical examples of high boiling alkyl alcohols are heptanol, octanol, decanol, isodecanol, dodecanol and tridecanol and tetradecanol and mixtures thereof. Because of its boiling range and ease of separation, isodecanol is preferred.

Typical examples of high boiling alkanes are decane, dodecane, tridecane, tetradecane, pentadecane, hexadecane, octadecane and eicosane. A commercially available mixture of high boiling alkanes is sold under the trade name Therminol D12® by Monsanto Company, St. Louis Mo. Therminol D12 is a mixture of synthetic hydrocarbons having a liquid range of –48° C. to 260° C. The straight chain alkanes, particularly dodecane, are preferred.

The high boiling alkanes are preferred in the process of this invention because of their relative inactivity with respect to the acid catalyst, phosphoric acid. In practice, it has been found that the high boiling alcohols require purification to remove color from the medium more frequently than is the case with high boiling alkanes. Also, losses of the alcohol in the range of about twenty percent due to reactivity with the acid catalyst are expenses which are not encountered in the use of high boiling alkanes. High boiling alkanes are relatively non-reactive with respect to phosphoric acid and the other reactants in the process of this invention. Furthermore, it has been found that the high boiling alkanes can be reused repeatedly without noticeable degradation or need of a special purification step.

One of the most important aspects of the process of this invention is the use of a uniform mixture of the starting acid in the reaction medium, particularly if a catalyst is employed. It has been found desirable to provide agitation in the reaction medium, particularly during the early phase of the reaction. The starting acid has a tendency to become tacky during the polymerization reaction causing the particulate material to congeal into large particles which impede the progress of the reaction. This condition can be avoided by employing adequate agitation, particularly during the early phase of the reaction. In a preferred embodiment, the reaction medium is subjected to agitation during the reaction to maintain the solids in the reaction medium dispersed in the liquid medium as much as possible.

When a catalyst is employed, such as the well known phosphoric acid, it is important that the starting acid and catalyst be thoroughly and uniformly mixed. This can be achieved by combining the acid catalyst with the starting acid before being added to the organic reaction medium of this invention. Preferably, the acid catalyst is added to the organic medium directly and then thoroughly mixed so as to achieve uniform dispersal of the catalyst.

One result of inadequate mixing of the reaction medium is an increase in the color of the final product. As noted above, one of the desired results of any process for producing polysuccinimide is to provide a product having a color as close to white as possible. If the catalyst is not uniformly mixed with the starting acid or if a uniform suspension in the organic medium is not maintained, some of the material will be polymerized and will remain in the medium, at elevated temperature, longer than desired while the remainder of the starting acid is being polymerized. However, a uniform mixture of catalyst with the starting acid and a dispersed uniform slurry in the organic reaction medium, typically achieved by means of agitation, provides the optimum process conditions.

The most widely used catalyst is phosphoric acid, employed at a concentration in the range of from about 0.1 percent to about 40 percent, by weight of starting acid. In one embodiment, 85% phosphoric acid is first blended thoroughly with the starting acid. While any means which achieves such mixing may be employed, the typical means is a centrifugal mixer such as that commercially available under the trade name Turbulizer. The dry particulate acid, such as aspartic acid, is fed to the mixer while being contacted with an aqueous solution of the acid catalyst. The starting acid, with catalyst, is then introduced into a reactor containing the organic reaction medium of this invention directly from the mixer. In a more preferred embodiment, the acid catalyst, typically phosphoric acid is combined with the organic medium after the addition of starting acid. Thorough mixing of the acid in the medium assures the uniform catalytic action on the starting acid thereby allowing uniform conversion of the starting acid to the polymeric product. This results in holding the polymer at reaction temperature the shortest possible time thereby preventing degradation and consequent increase in the color of the polymer.

The condensation reaction of L-aspartic acid to form polysuccinimide takes place in the range of from about 140° C. to about 200° C., and optimally in the range of from 160° C. to about 180° C. Such temperature range provides for adequately rapid polymerization so that the reaction time is reasonably short, i.e., the optimum balance between completion of the reaction and limited exposure of the reaction product to high temperature. As noted above a short reaction time at elevated temperature favors the production of light colored material while holding the polymer at reaction temperature for an extended period of time increases the amount of color in the product and darkens it. Reaction time in the range of from about 1 to 2 hours, preferably 1.5 hours, is usually sufficient to provide maximum conversion of the starting acid while not allowing excessive color to develop in the product. However, as also observed, the molecular weight of the polymer is increased with increase in reaction time in the temperature range noted above.

Because color is an important property of polysuccinimide, reflectance measurements by standard means provide an important guide to optimum reaction conditions. It has been found that the color (as measured by reflectance) of the polymer product of the process of this invention is superior to the color of the polymer product produced by the comparable thermal processes conducted in various dryer means typical of the prior art, i.e., tray dryers, ovens and rotary dryers. Reflectance measurement of a typical starting acid, L-aspartic acid, indicates a reflectance of white light of about 96%. Polymer produced by typical, comparable prior art processes indicates a reflectance of white light in the range of from about 40% to about 55%. Surprisingly, polysuccinimide product produced in accordance with the process of the present invention indicates a reflectance of white light in the range of from about 80% to above 90% as will be shown by the experimental data provided below.

As noted above, it is advantageous to employ an acid catalyst in the process of this invention and the most typical of such acids is phosphoric acid. While uniformity of admixture with the starting acid provides the most optimum condition in this regard, it has been found that in some instances wherein there is observed only a partial completion of the reaction after raising the slurry in the reactor to reaction temperature (about 140° C.), there has been non-uniform admixture of the catalyst thereby allowing rapid condensation reaction of only a portion of the starting acid. It has been found that, to avoid such conditions, the catalyst is added in two portions. The first portion of acid catalyst is added before raising the reaction mass to the reaction temperature. Then, a second addition of acid catalyst to the reaction slurry after achieving reaction temperature provides an increase in the reaction rate thereby completing the reaction more quickly and without unduly long exposure of the polysuccinimide in the reactor to elevated temperature. For example, in the use of phosphoric acid as a catalyst, an additional amount of catalyst up to that equal to the initial amount charged to the reactor will quickly increase the reaction rate. Such increase in reaction rate decreases the time required for completion of the condensation reaction and shortens the time of exposure of the reaction product to the elevated temperature required for the reaction. Improved color and more uniform particle size of the resulting product are observed in processes wherein the phosphoric acid catalyst is added in at least two steps.

To further illustrate the process of the present invention there is described below non-limiting preferred embodiments. In the following examples percentage values are percent by weight unless otherwise specified. All reactions were conducted under a nitrogen atmosphere.

EXAMPLE 1

A series of runs were conducted employing a L-aspartic acid with phosphoric acid catalyst. Approximately 80 g of L-aspartic acid was employed in each run in approximately 400 g of isodecanol. The catalyst was added to the system directly to the reaction medium. The reaction vessel was a round bottom flask containing isodecanol as the organic medium and was fitted with a heating mantle and a condenser. The reaction time was measured from the time the reaction medium reaches approximately 140° C. until termination by removal from the heat source. Molecular weight is an average of two measurements as determined by the GPC method.

TABLE 1

| Run No. | % Catalyst | Temp. Range °C. | Reaction Time | Molecular Weight |
|---|---|---|---|---|
| 1 | — | 149.9–160 | 58 min. | 9296 |
| 2 | 21 | 159–164.5 | 85 min. | 9817 |
| 3 | " | 140.5–163.8 | 210 min. | — |
| 4 | " | 137.8–180 | 150 min. | 11,993 |
| 5 | 42.5 | 135.2–180 | 230 min. | 11,850 |

EXAMPLE 2

The reaction medium employed in Runs 1–5 of Example 1 above was distilled to recover purified isodecanol for reuse. A portion, 276.2 g was distilled at a temperature in the range of from 209.6° C. to 218.3° C. over a 1 hour period. A residue of 10.9 g was left in the pot while 204.8 g of isodecanol and 51.6 g of water were recovered. This represented 91.1 percent recovery of the organic medium for reuse.

EXAMPLE 3

In this example the L-aspartic acid was added to the reactor step-wise to increase the amount in the reaction medium. Into a reactor were added 400.53 g of isodecanol, 40 g of 85% phosphoric acid with stirring. The mixture was heated to 160° C. at which time 80 g of L-aspartic acid was added. With continued heating for 40 minutes at 160° C., a second portion, 20 g of L-aspartic, was added. Thirty minutes later an additional 20 g of L-aspartic acid was added to the reaction medium while maintaining a reaction temperature of 160° C. The reaction continued for an additional 3 hrs. 15 minutes for a total reaction time of about 4.5 hrs. The reaction provided a yield of 96% of theoretical polysuccinimide having a molecular weight of 10,694 and exhibiting a highly acceptable light color.

EXAMPLE 4

Into a reactor was charged 403.5 g of isodecanol and 20 g of 85% phosphoric acid. This charge was heated to 95° C. and a charge of 120 g of L-aspartic acid was made to the reactor. The temperature was raised to 140° C. in 30 minutes and then raised to 200° C. gradually over a period of about 3 hrs then held at that temperature for an additional hour. Large crystalline product was removed from the reaction medium by filtration to yield 94 g of polysuccinimide having a molecular weight of 13,264. The product represented a 100% conversion of the starting acid to polymer.

EXAMPLE 5

Into a reactor equipped with heating mantle and a standard agitator configuration was placed 370 g of dodecane and 150 g of L-aspartic acid. The mixture was agitated to provide a uniform mixture and then 12.2 g of 85% phosphoric acid was added. The reaction temperature was held at 180° C. and was 100% complete after 90–100 minutes. To the reactor was added 343 g of a 15% aqueous solution of sodium hydroxide. The mixture was held at 50°–70° C. for 30 minutes with agitation to hydrolyze the polymer to polyaspartic acid. The polymer remained in the aqueous phase and was recovered by decanting the organic medium thereby leaving an aqueous solution of polyasparatic acid.

EXAMPLE 6

The polysuccinimide produced in Examples 1–4 above was subjected to light reflectance measurements by means of a Hunter Labscan spectrophotometer. A white porcelain plate was measured to establish a reference reading. The parameters for the reflectance measured at different wave lengths for these readings are as follows:

| Black = 0 | White = 100 | R2 |
|---|---|---|
| green = –8 | red = +8 | (a) |
| blue = –28 | yellow = +28 | (b) |

The results of the reflectance measurements are present in Table 2 below.

TABLE 2

| Sample | Rd | (a) | (b) |
|---|---|---|---|
| Standard | 85.31 | 0.98 | –0.19 |
| L-aspartic acid | 96.15 | –.50 | 2.39 |
| Run 1 | 91.57 | –1.53 | 7.08 |
| Run 2 | 86.0 | –0.88 | 10.98 |
| Run 3 | 94.42 | –1.96 | 6.49 |
| Run 4 | 88.92 | –0.91 | 9.51 |
| Run 5 | 88.47 | –.016 | 6.83 |
| Ex. 3 | 91.2 | –1.89 | 10.5 |
| Ex. 4 | 77.09 | –1.891 | 9.68 |
| Ex. 5 | 86.25 | –2.10 | 11.16 |
| Prior art* | 52.48 | 4.56 | 21.06 |
| Prior art** | 43.09 | 8.56 | 25.23 |

*Product of a process as described in U.S. Pat. No. 5,3.19,145 but with about 20% phosphoric acid catalyst.
**Product of a process as described in U.S. Pat. No. 5,319,145 with no catalyst.

EXAMPLE 7

Into a reactor equipped with a stirrer there was charged 379.8 g of hexadecane and 150.3 g of L-aspartic acid. The acid and alkane were mixed well and then 26.5 g of 85% phosphoric acid was added slowly in two separate charges over 50 min. The reaction slurry was heated to 180° C. with agitation and the slurry held for an additional 1 hour for a total reaction time of 110 min. The product was composed of large particles which filtered easily to provide 149.5 g of polysuccinimide exhibiting very light color. The molecular weight of the product was 11,350. The reaction medium remained nearly colorless and was easily recovered and was found to have a neutral pH of 7. The hexadecane was easily recovered and reused without need for purification.

EXAMPLE 8

The process of Example 5 was repeated except that the phosphoric acid catalyst was added in two stages. Initially, 4.2 g of phosphoric acid and 60 g of L-aspartic were added to the dodecane. The slurry was heated to 150° C. until the solids agglomerated slightly. Then, and additional 8.6 g of 85% phosphoric acid was added and the temperature of the slurry raised to 190° C. for an additional 30 minutes for a total reaction time of about 90 min. A pale yellow polymer was recovered from the reaction mixture by filtration having a molecular weight of 17,640. The yield of polymer was 41 g.

EXAMPLE 9

To an Ace reactor was added 374.2 g of dodecane which was heated to 107.3 C. A pre-mix of 108.4 g of L-aspartic acid containing 7 g of 85% phosphoric acid which was ground to a fine powder was then added. In this reaction the reaction medium was subjected to agitation which maintained the solids in the reactor in a substantially dispersed condition throughout the organic reaction medium. The slurry was heated gradually to 180° C. over a period of 50 minutes. After a reaction time of 35 minutes a second addition of 7 g of 85% phosphoric acid was made which appeared to increase the reaction rate by a rapid increase in the release of water from the reaction mixture. The reaction was discontinued after a total reaction time above 140° C. of 1 hr. 25 minutes. The reaction mixture was held at 180° C. for a period of 45 minutes. Analysis of the resulting polysuccinimide indicated nearly 100 percent conversion and a molecular weight of 12,993. The dried product color was slightly off white.

There has been described above a convenient, economical method for producing polysuccinimide having an acceptable color for use directly into such utilities as detergent and other uses where light color is required. The high boiling organic medium of this invention has been shown to be reusable, in many instances without purification. When purification is required it is conveniently accomplished by simple distillation thereby providing an efficient means to provide light colored polysuccinimide not heretofore conveniently obtainable in large quantities in an industrial process.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

EXAMPLE 10

Into a reactor equipped with a stirrer, heating mantle and means to provide a nitrogen purge there was charged 453.3 g of hexadecane. After raising the temperature of the hexadecane to about 185° C., 199.6 g of L-aspartic acid was added. The acid and alkane were mixed well and heated over a period of about 30 minutes to a temperature of 200° C. at which time water began to be released rapidly from the mixture. The reaction slurry was held at about 200° C. for about 1 hr. and 40 minutes at which time water release had reduced markedly. A sample indicated that conversion of the starting acid to polymer was about 42% at that time. The temperature was then raised to 220° C. and held at that temperature for an additional 1 hr. and 20 minutes which provided 100% conversion of the starting acid to polymer. The entire reaction was run with constant agitation. The product, 143 g of polysuccinimide, was composed of fine particles exhibiting a pink color. The reaction medium remained nearly colorless and about 419 g of the alkane was easily recovered by filtration.

What is claimed is:

1. A process for preparing polysuccinimide by the thermal condensation of L-aspartic acid which comprises providing a high boiling organic reaction medium selected from the group consisting of high boiling straight or branched chain alkyl alcohols having from 7 to 14 carbon atoms and mixtures thereof and straight or branched chain alkanes having from 10 to 20 carbon atoms and mixtures thereof, heating the amino acid in said medium for a sufficient time to polymerize said amino acid.

2. The process of claim 1 wherein the medium is heated to a temperature in the range of from about 140° C. to about 260° C.

3. The process of claim 2 wherein the reaction time is in the range of from about 1 to about 2 hours.

4. The process of claim 1 wherein the reaction medium comprises an alcohol selected from the group consisting of decanol, isodecanol and dodecanol.

5. The process of claim 4 wherein the alcohol is isodecanol.

6. The process of claim 1 wherein the reaction medium comprises an alkane selected from the group consisting of dodecane, tetradecane, hexadecane, octadecane and eicosane.

7. A process for preparing polysuccinimide by the thermal condensation of L-aspartic acid which comprises providing a high boiling organic reaction medium selected from the group consisting of high boiling straight or branched chain alkyl alcohols having 7 to 14 carbon atoms and mixtures thereof and straight or branched chain alkanes having from 10 to 20 carbon atoms and mixtures thereof and an acid catalyst for said condensation reaction, heating the acid in said medium in the presence of said catalyst for a sufficient time to polymerize said amino acid.

8. The process of claim 7 wherein the reaction medium is heated to a temperature in the range of from about 140° C. to about 260° C.

9. The process of claim 8 wherein the reaction time is in the range of from about 1 to about 2 hours.

10. The process of claim 7 wherein the reaction medium comprises an alcohol selected from the group consisting of decanol, isodecanol and dodecanol.

11. The process of claim 7 wherein the reaction medium comprises and alkane selected from the group consisting of dodecane, tetradecane, hexadecane, octadecane and eicosane.

12. The process of claim 11 wherein the alkane is dodecane.

13. The process of claim 7 wherein the catalyst is premixed with the amino acid prior to being placed in said reaction medium.

14. The process of claim 7 wherein the catalyst selected from the group consisting of phosphoric acid and methanesulfonic acid.

15. The process of claim 7 wherein the catalyst is present in the amount of from about 0.1 to about 40 percent by weight of said amino acid.

16. The process of claim 7 wherein the catalyst is added directly to said high boiling organic reaction medium prior to the addition of the starting acid.

17. The process of claim 7 wherein the catalyst is added in at least two portions to said reaction medium, a first portion added to the organic medium before the initiation of the condensation reaction and the second portion being added at least 30 minutes after the initiation of the condensation reaction.

18. The process of claim 7 further including the steps of separating the polysuccinimide from said reaction medium and reusing said medium in a process of claim 7 at least once.

19. The process of claim 18 wherein the reaction medium is reused directly in said process without further treatment.

20. A process for the production of polysuccinimide by the thermal condensation of L-aspartic acid in the presence of phosphoric acid catalyst in an organic medium comprising dodecane at a temperature in the range of from about 140° C. to about 200° C. for a period of from about 1 to about 2 hours.

21. The process of claim 20 wherein at least a portion of the phosphoric acid is added to the reaction medium after initiation of the reaction.

22. The process of claim 20 wherein the polysuccinimide is hydrolyzed by means of contacting the polymer with a basic aqueous solution in the presence of the organic medium whereby the hydrolyzed polymer remains in the aqueous phase.

* * * * *